US011908371B2

(12) United States Patent
Chiu et al.

(10) Patent No.: US 11,908,371 B2
(45) Date of Patent: Feb. 20, 2024

(54) AUTOMATIC GAMMA ADJUSTMENT SYSTEM WITH ENVIRONMENTAL ADAPTABILITY

(71) Applicant: STARLIGHT DISPLAY CORPORATION, Hsinchu (TW)

(72) Inventors: Shao-Wei Chiu, Hsinchu (TW); Yi-Yu Tsai, Hsinchu (TW); Yin-Cheng Huang, Hsinchu (TW)

(73) Assignee: STARLIGHT DISPLAY CORPORATION, Hsinchu (TW)

( * ) Notice: Subject to any disclaimer, the term of this patent is extended or adjusted under 35 U.S.C. 154(b) by 0 days.

(21) Appl. No.: 18/201,173

(22) Filed: May 23, 2023

(65) Prior Publication Data

US 2023/0410712 A1 Dec. 21, 2023

(30) Foreign Application Priority Data

Jun. 17, 2022 (TW) .................................. 111122663

(51) Int. Cl.
*G09G 3/20* (2006.01)

(52) U.S. Cl.
CPC ... *G09G 3/2007* (2013.01); *G09G 2320/0276* (2013.01); *G09G 2320/041* (2013.01); *G09G 2320/0626* (2013.01); *G09G 2360/16* (2013.01)

(58) Field of Classification Search
CPC ..... G09G 2320/0673; G09G 2360/144; G09G 2320/0626; G09G 3/20
See application file for complete search history.

(56) References Cited

U.S. PATENT DOCUMENTS

2003/0020725 A1* 1/2003 Matsuda ................ H04N 1/407 345/600
2013/0069924 A1* 3/2013 Robinson ................ G09G 3/20 345/207
2013/0321485 A1* 12/2013 Eom .................... G09G 3/3208 345/82
2015/0187094 A1* 7/2015 Lee ......................... G06T 5/009 345/590
2017/0011692 A1* 1/2017 Lee ...................... G09G 3/3233
(Continued)

FOREIGN PATENT DOCUMENTS

CN 200941292 8/2007
CN 101923817 12/2010

*Primary Examiner* — Van N Chow
(74) *Attorney, Agent, or Firm* — Fei-hung Yang

(57) ABSTRACT

In an automatic gamma adjustment system with environmental adaptability, the system is installed in a display device and an image signal source is selected, such that an image signal is received and converted into first YUV signals, while detecting the surrounding situation to obtain at least one environmental data, and obtaining a gamma control parameter of a display screen of the display device according to the environmental data. When the environmental data is calculated to obtain a maximum brightness current value, the gamma control parameter is used to calculate the first YUV signals as second YUV signals, and the maximum brightness current value and the second YUV signals are sent to the display device for displaying the image. Therefore the grayscale layering effect of an image presented to people can be adjusted by automatically correcting the gamma value according to the surrounding situation at any time.

8 Claims, 5 Drawing Sheets

(56) References Cited

U.S. PATENT DOCUMENTS

| | | | | |
|---|---|---|---|---|
| 2022/0319381 | A1* | 10/2022 | Xiao | G09G 3/2074 |
| 2023/0143803 | A1* | 5/2023 | Lee | G09G 3/20<br>345/690 |

* cited by examiner

AUTOMATIC GAMMA ADJUSTMENT SYSTEM WITH ENVIRONMENTAL ADAPTABILITY

CROSS-REFERENCE TO RELATED APPLICATIONS

This non-provisional application claims priority under 35 U.S.C. § 119(a) on Patent Application No(s). 111122663 filed in Taiwan, R.O.C. on Jun. 17, 2022, the entire contents of which are hereby incorporated by reference.

BACKGROUND

Technical Field

The present disclosure relates to the field of a gamma correction system of display device, and more particularly relates to an automatic gamma adjustment system with environmental adaptability.

Description of Related Art

When projecting digital images through a display screen, if the image is displayed on a panel without gamma correction, the viewer will often feel that the image is white, too-bright, or too-dark, and this is due to the photosensitive function of the display device. The brightness intensity of the pixel is not linearly related to the input voltage intensity, and the way for human eyes to capture the brightness is also not proportional. It is the case under non-extremely dark or non-extremely bright conditions, and the normal vision of the human eyes is more sensitive to the change in dark tones and other factors. For this reason, in addition to the adjustment of the image color effect by adjusting the brightness of backlight or the driving current of the panel, all kinds of display devices on the market are actively improving the accuracy of gamma correction, in order to achieve the effect of accurately adjusting the balance of color grayscale in pixel values to correct the overall visual brightness effect of the image.

However, when a traditional display device adjusts the gamma value, it is often performed by the driver IC at the end of the overall device circuit, and this structure increases the complexity of the circuit design of the driver IC. Especially for a display device that uses a plurality of small and medium-sized panels to form a large screen, the design complexity will be increased significantly because the driver ICs on each of the small and medium-sized panels need the setting of synchronous or serial signals. Furthermore, if the image input signal received by the display screen is an RGB signal, the setting value must be changed for each RGB signal source, which further increases the complexity of software design, and such traditional display device is not conducive to the economic benefits of industrial development. In view of this problem, it is the subject for the present disclosure to find a feasible solution to use the YCbCr conversion technology to convert any image input signal into YUV signal, while calculating or looking up the optimal gamma value according to the surrounding environmental parameter of the real-time device, so as to improve the aforementioned drawback of the prior art, optimize the balance of image color grayscale, and achieve the most comfortable image display effect for human eyes.

SUMMARY

Therefore, it is a primary objective of the present disclosure to provide an automatic gamma adjustment system that can achieve the effect of optimizing the overall image quality according to environmental conditions by optimizing the driving current of the display screen and the grayscale value of the image color through environmental parameters.

To achieve the aforementioned and other objectives, this disclosure discloses an automatic gamma adjustment system with environmental adaptability, installed in a display device, and provided for automatically correcting a gamma value at any time according to the surrounding situation to adjust the grayscale layering presented to people. This disclosure is characterized in that the automatic gamma adjustment system with environmental adaptability includes a signal receiving processor, a situation capture processor and a layering control processor, and the signal receiving processor selects an image signal source and receives and converts an image signal into a plurality of first YUV signals; the situation capture processor detects the surrounding situation to capture and obtain at least one environmental data, and obtains a gamma control parameter of a display screen of the display device according to the calculation of the environmental data; and the layering control processor calculates the environmental data to obtain a maximum brightness current value, while using the gamma control parameter to calculate the first YUV signals as a plurality of second YUV signals, and sends the maximum brightness current value and the second YUV signals to the display device, which are provided for the display screen to display the image according to the maximum brightness current value and the second YUV signals.

Wherein, the environmental data include air quality, weather condition, and ambient brightness. The display device uses an 8-bit, 13-bit, 16-bit or 24-bit grayscale image to display the image, and when the grayscale level is greater than 256 levels, and the layering control processor uses the gamma control parameter to calculate and obtain the second YUV signals, an adaptive offset compensation is used to adjust the brightness values of the 0~8$^{th}$ grayscale layers, such that the brightness values of the 0~8$^{th}$ grayscale layers do not have consecutive zero outputs; after the adaptive offset compensation counts the total number of levels with a brightness value equal to 0 in the 1$^{st}$~8$^{th}$ grayscale layers, reads the minimum brightness value in the 1$^{st}$~8$^{th}$ grayscale layers, and lists the missing decimal integers and the quantity of missing decimal integers within a non-consecutive numbers range of the 1$^{st}$~8$^{th}$ grayscale layers, the minimum brightness value is filled into the first grayscale layer, and then the decimal-integers are used sequentially to linearly adjust the brightness value of at least some of the 0~8$^{th}$ grayscale layers. The display device uses an 8-bit, 13-bit, 16-bit or 24-bit grayscale image to display the image, and when the grayscale level is greater than 256 levels, the layering control processor calculates and obtains the second YUV signals by the gamma control parameter, an adaptive adjustment is used to adjust the brightness values of the 0~8$^{th}$ grayscale layers, such that the brightness values of the 0~8$^{th}$ grayscale layers do not have four or more consecutive zero outputs of the brightness values.

In addition, the display screen is formed by a plurality of display panels, and the display device makes one of the display panels as a commander and the rest of the display panels as followers, and after the display panel acting as the commander receives the second YUV signals and the maximum brightness current value transmitted by the layering control processor to drive the display panels acting as the remaining followers to use the second YUV signals and the maximum brightness current value to display the image, such that the image displayed by the display screen shows a unified grayscale layering. The layering control processor includes a memory storage unit, provided for the layering control processor to use the gamma control parameter to calculate and obtain the second YUV signals and buffer the second YUV signals into the memory storage unit, or use the gamma control parameter to look up in a table to obtain the second YUV signals stored in the memory storage unit; wherein the memories of the memory storage unit and the display device have a first gamma parameter conversion table and a second gamma parameter conversion table respectively, provided for the layering control processor to look up the second YUV signals from the first gamma parameter conversion table and the second gamma parameter conversion table, such that the memory storage unit can still provide multi-selective gamma groups in the case of low memory storage capacity; the layering control processor includes a temperature protection unit and a maximum brightness conversion unit, the temperature protection unit is electrically connected to the display screen for receiving a current working temperature fed back by the display screen, and driving the maximum brightness conversion unit to adjust the maximum brightness current value if the obtained current working temperature is determined to be not falling within a safe interval value; and the layering control processor further converts the second YUV signals into a plurality of RGB signals.

After the signal receiving processor analyses the image signal to obtain a corresponding image grayscale distribution data, and the layering control processor analyses the image grayscale distribution to highlight a range with concentrated image grayscale distribution, the image signal in the range is used to calculate the gamma control parameter to obtain the second YUV signals corresponding to a full grayscale level, so as to improve the fineness of the grayscale presented in the range, so that the overall too-dark or too-bright image can be presented with rich detailed image to satisfy the visual experience of human eyes.

In summation of the description above, the present disclosure uses the layering control processor to pre-process the image signal and directly provide the second YUV signals with maximum current parameter after white balance and optimal eye comfort to the display device, such that the display screen can directly use the received parameters or data for the display of the image without the need of calculating each of the R, G, B signals, so as to reduce the software design complexity and hardware specification requirements of the IC in the display device. In order to provide the second YUV signals with optimal eye comfort, the present discloser uses the environmental data captured by the situation capture processor to calculate and obtain the gamma control parameter.

Based on the real surrounding environment, the most suitable gamma value for human eyes is selected, so that even the image of a crow flying in the dark night can still be clearly presented to the viewer without any deviation, that is, to achieve the optimal display quality and the perfect visual comfort for human eye.

DESCRIPTION OF THE EMBODIMENTS

This disclosure will now be described in more detail with reference to the accompanying drawings that show various embodiments of this disclosure.

Figure 1:
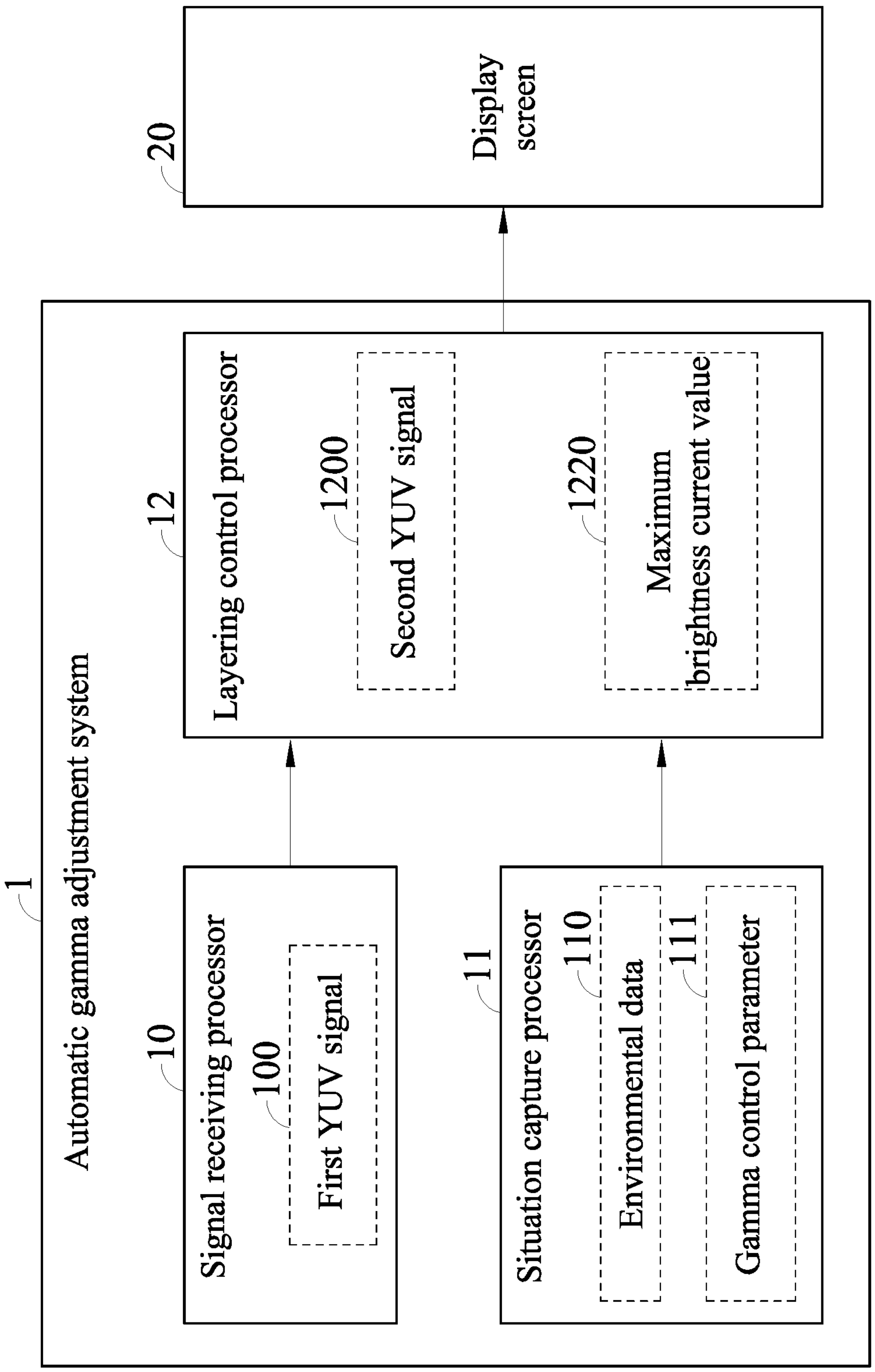
FIG. 1 is a block diagram showing the structure of a first preferred embodiment of this disclosure.
Figure 2:
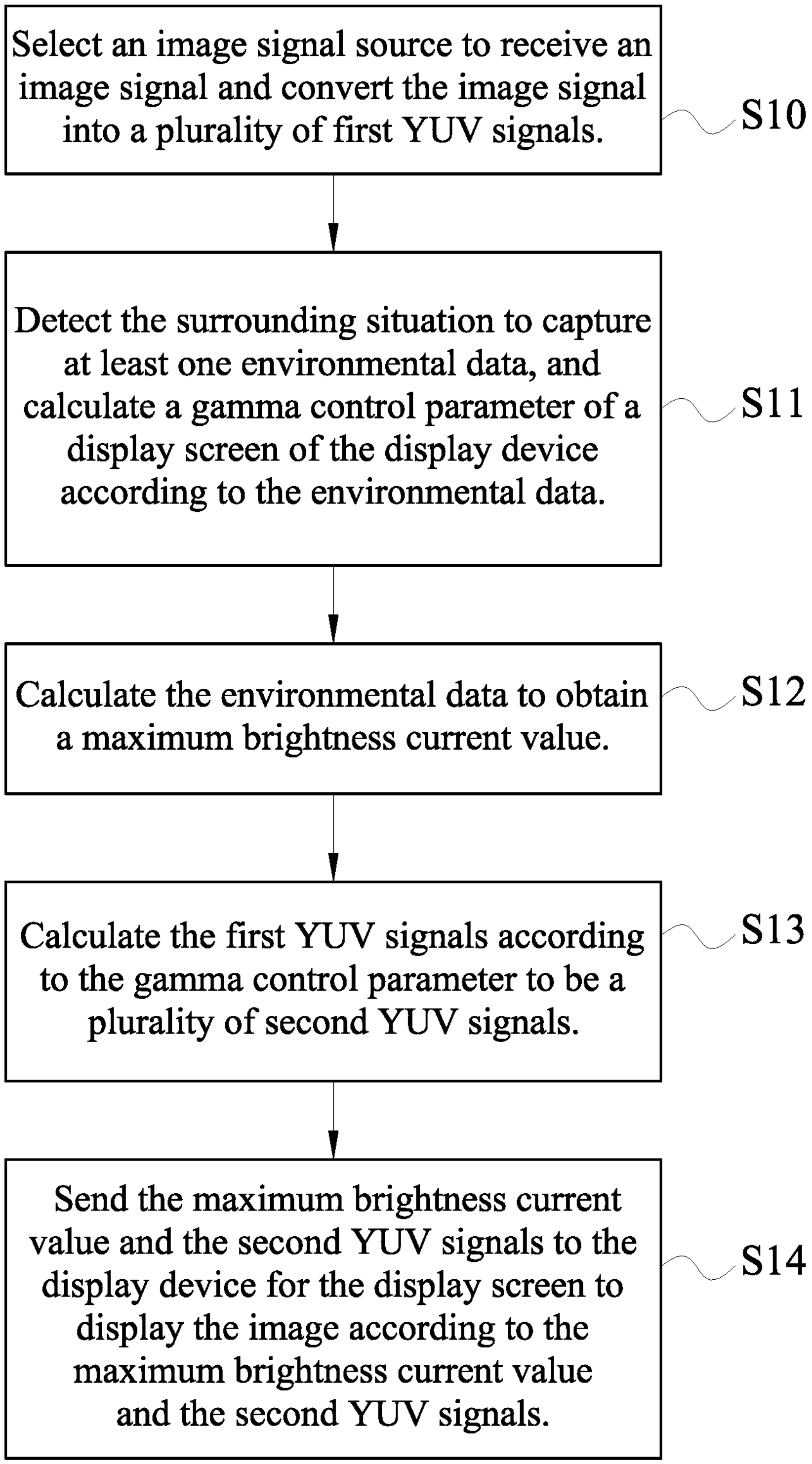
FIG. 2 is a flow chart of the first preferred embodiment of this disclosure.

With reference to FIGS. 1 and 2 for the block diagram and flow chart of a preferred embodiment of the present disclosure respectively, the automatic gamma adjustment system with environmental adaptability 1 is installed to a display device (not shown in the figure) and provided for automatically correcting a gamma value at any time according to the surrounding situation to adjust the grayscale layering presented to people. The automatic gamma adjustment system 1 includes a signal receiving processor 10, a situation capture processor 11 and a layering control processor 12, and the automatic adjustment method of the automatic gamma adjustment system 1 includes the following steps (S10 to S14)

- S10: The signal receiving processor 10 selects an image signal source to receive an image signal and convert the image signal into a plurality of first YUV signals 100.
- S11: The situation capture processor 11 detects the surrounding situation to capture and obtain at least one environmental data 110, and obtains a gamma control parameter 111 of a display screen 20 of the display device according to the calculation of the environmental data 110.
- S12: The layering control processor 12 calculates the environmental data 110 to obtain a maximum brightness current value 1220.
- S13: Meanwhile, the layering control processor 12 uses the gamma control parameter 111 to calculate the first YUV signals 100 as a plurality of second YUV signals 1200.
- S14: The layering control processor 12 sends the maximum brightness current value 1220 and the second YUV signals 1200 to the display device for the display screen 20 to display the image according to the maximum brightness current value 1220 and the second YUV signals 1200.

Figure 3:
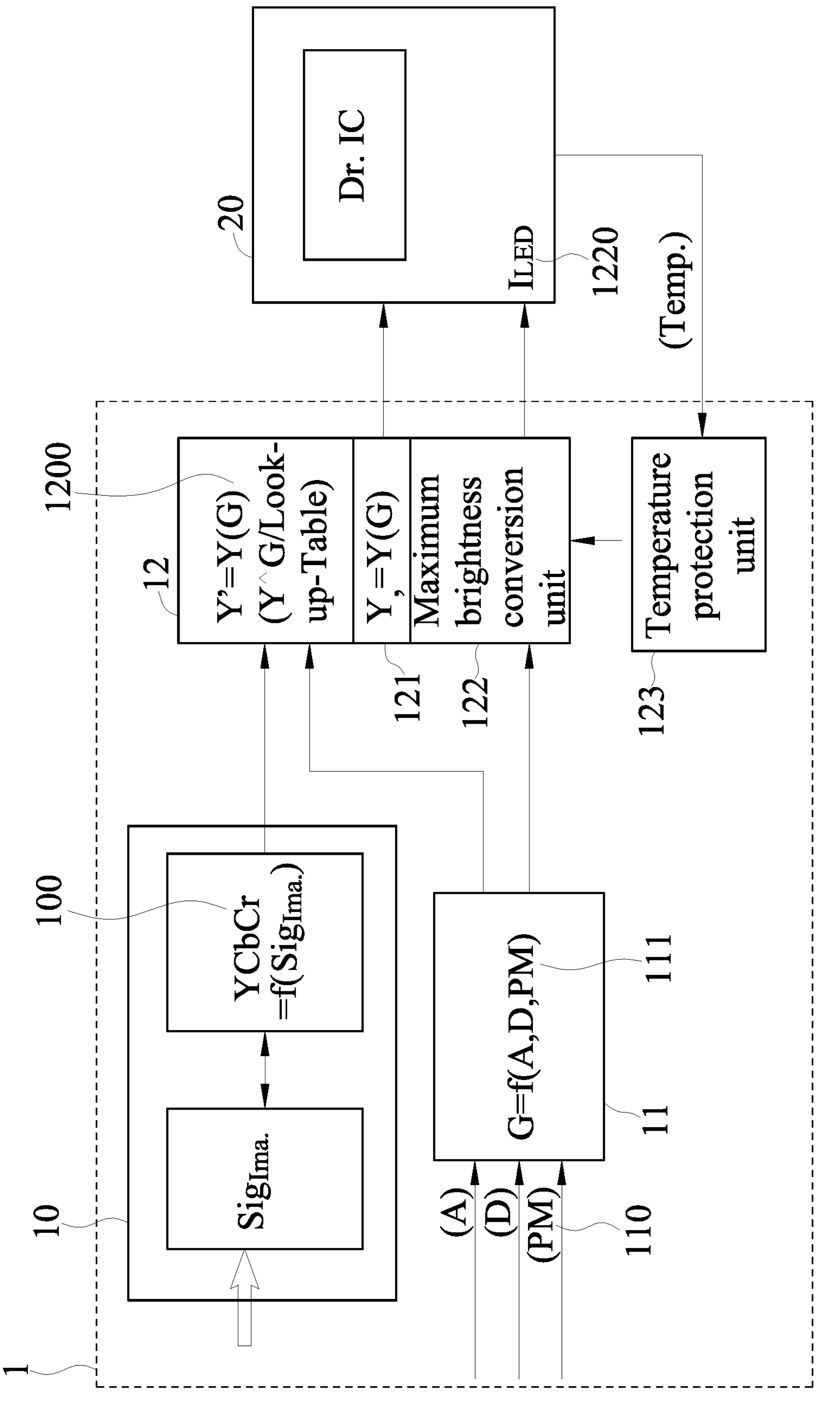
FIG. 3 is a block diagram showing the structure of a second preferred embodiment of this disclosure.
Figure 4:
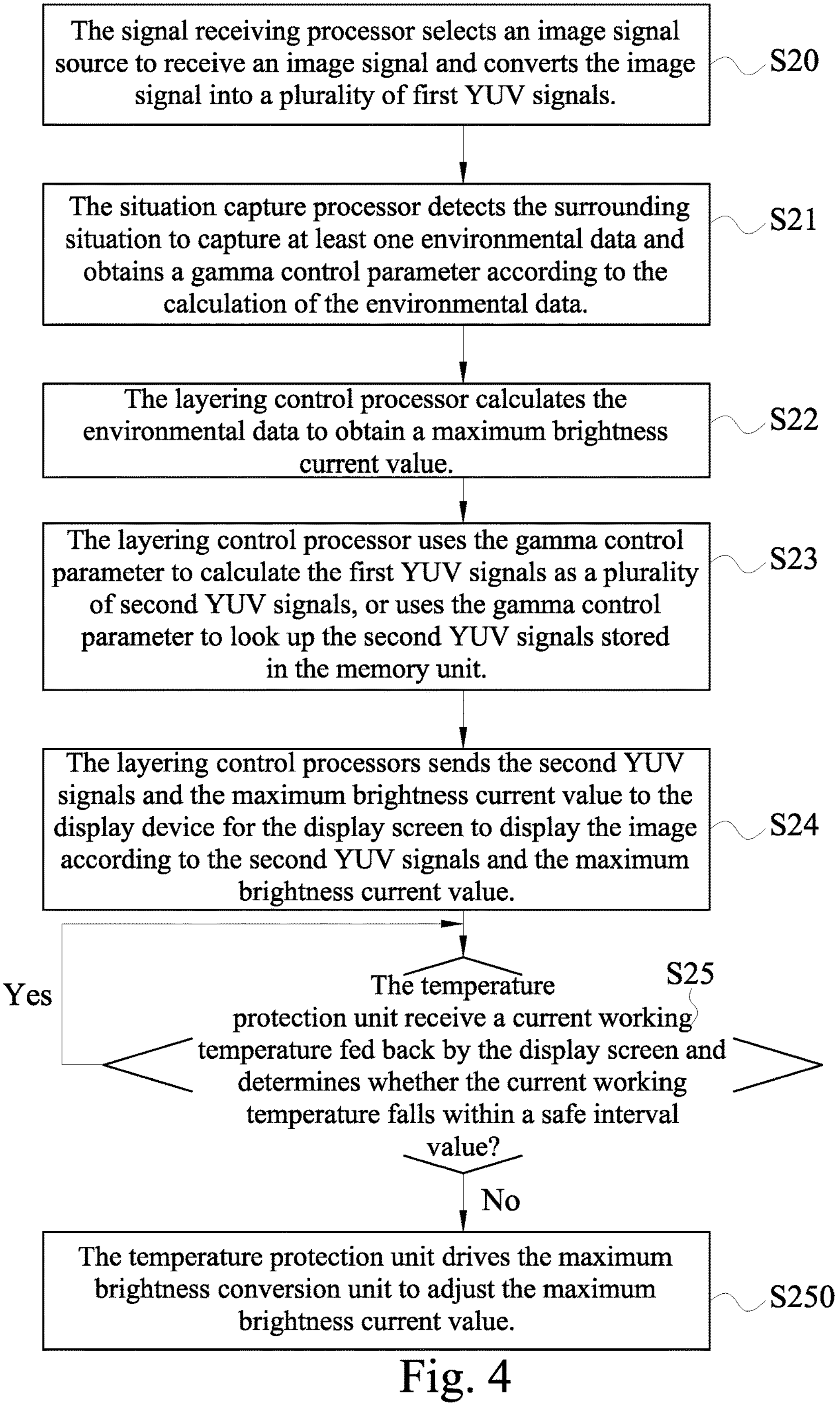
FIG. 4 is a flow chart of the second preferred embodiment of this disclosure.
Figure 5:
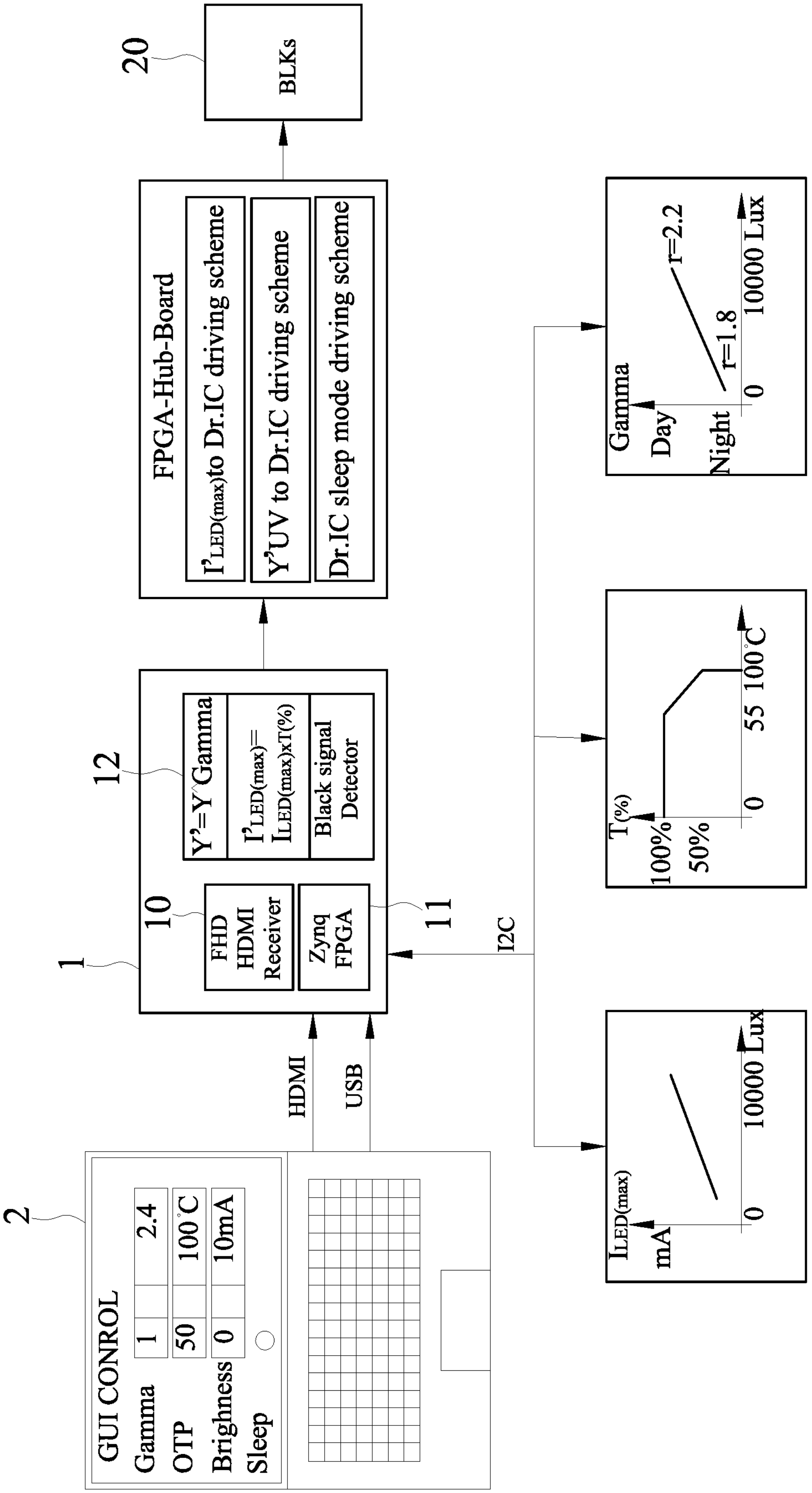
FIG. 5 is a schematic view showing an application of the second preferred embodiment of this disclosure.

With reference to FIGS. 3 to 5 for the block diagram, flow chart and schematic view of a second preferred embodiment of the present disclosure respectively, the automatic gamma adjustment system with environmental adaptability 1 is installed to a display device (not shown in the figure) and the automatic gamma adjustment system with environmental adaptability 1 includes a signal receiving processor 10, a situation capture processor 11 and a layering control processor 12 and is provided for automatically correcting a gamma value at any time according to the surrounding situation to adjust the grayscale layering presented to people. The layering control processor 12 includes a memory storage unit 121, a maximum brightness conversion unit 122 and a temperature protection unit 123. The temperature protection unit 123 electrically connected to the display screen 20, and the automatic adjustment method of the automatic gamma adjustment system 1 includes the following steps (S20 to S25 and S250).

- S20: The signal receiving processor 10 selects an image signal source, such as HDMI, eDP/DP, DVI, LVDS, VGA, MHL, V-by-One HS or MIPI-DSI to receive an image signal (SigIma), and converts the image signal into a plurality of first YUV signals 100.

S21: The situation capture processor 11 detects the surrounding situation to capture and obtain at least one environmental data 110 such as air quality (PM), weather condition (D) and ambient brightness (A), etc. and obtains a gamma control parameter (G) 111 of a display screen 20 of the display device according to the calculation of the environmental data 110.

S22: The layering control processor 12 calculates the environmental data 110 to obtain a maximum brightness current value 1220.

S23: Meanwhile, the layering control processor 12 uses the gamma control parameter 111 to calculate the first YUV signals 100 as a plurality of second YUV signals 1200 with optimal eye comfort and buffers the plurality of second YUV signals 1200 into the memory storage unit 121, or the layering control processor 12 uses the gamma control parameter 111 look-up-table (LUT) to obtain the second YUV signals 1200 stored in the memory storage unit 121. Wherein, the memories of the memory storage unit 121 and the display device include a first gamma parameter conversion table and a second gamma parameter conversion table respectively provided for the layering control processor 12 to look up the second YUV signals 1200 from the first gamma parameter conversion table and the second gamma parameter conversion table, such that the memory storage unit 121 can still provide multi-selective gamma groups in the case of low memory storage capacity. When the number of gamma lookup table is limited, the memory of the display device and the second gamma parameter conversion table built in the memory can be used for table lookup and conversion, so that the multi-selective gamma groups can be provided to the layering control processor 12 to achieve the effect of making the color and brightness of the displayed image adaptable to the surrounding environment.

S24: The layering control processor 12 sends the maximum brightness current value 1220 and the second YUV signals 1200 to the driver IC (Dr. IC) of the display device, which are provided as a basis for the display screen 20 to consider the maximum brightness current value 1220 of the surrounding environmental parameter and the second YUV signals 1200 with optimal eye comfort for the displayed image. Therefore, the error of each grayscale color can be reduced effectively to improve the fineness of the grayscale color in a dark field, so as to achieve the effect of clearly presenting the image such as the image of a black man shooting a crow in a dark night, thereby satisfying the expected value of an image viewed by human eyes. It is noteworthy that the display screen 20 is composed of a plurality of display panels, and the display device makes one of the display panels as a commander and the rest of the display panels as followers, and after the display panel acting as the commander receives the second YUV signals 1200 and the maximum brightness current value 1220 transmitted by the layering control processor 12 to drive the display panels acting as the remaining followers to use the second YUV signals 1200 and the maximum brightness current value 1220 to display the image, such that the image displayed by the display screen 20 shows a unified grayscale layering and a consistent color brightness.

In addition, the layering control processor 12 can convert the second YUV signals 1200 into a plurality of RGB signals and then send the RGB signals and the maximum brightness current value 1220 altogether to the display screen 20.

S25: The temperature protection unit 123 receive a current working temperature (Temp.) fed back by the display screen 20, and determines whether the current working temperature falls within a safe interval value, such as 55° C.~80° C. If not, the current working temperature is higher or lower than the safe interval value.

S250: The temperature protection unit 123 drives the maximum brightness conversion unit 122 to adjust the maximum brightness current value 1220. In this embodiment, when the signal receiving processor 10 receives the image signal, the image signal is analysed to obtain a corresponding image grayscale distribution data, and after the layering control processor 12 analyses the image grayscale distribution to highlight a range with concentrated image grayscale distribution, the image signal in the range is used to calculate the gamma control parameter 111 to obtain the second YUV signals 1200 corresponding to a full grayscale level, so as to improve the fineness of the grayscale presented in the range, so that the overall too-dark or too-bright image can be presented with rich detailed image to satisfy the visual experience of human eyes.

In addition, the display device uses an 8-bit, 13-bit, 16-bit or 24-bit grayscale image to display the image, and when the grayscale level is greater than 256 levels, and the layering control processor 12 uses the gamma control parameter 111 to calculate and obtain the second YUV signals 1200, an adaptive offset compensation is used to adjust the brightness values of the 0~$8^{th}$ grayscale layers in a dark field, such that the brightness values of the 0~$8^{th}$ grayscale layers do not have consecutive zero outputs; or an adaptive adjustment is used to adjust the brightness values of the 0~$8^{th}$ grayscale layers, such that the brightness values of the 0~$8^{th}$ grayscale layers do not have four or more consecutive zero outputs. For example, when a 13-bit image is displayed, the Y grayscale value as shown in the equation of converting the second YUV signals 1200 proposed by the present disclosure can be obtained, wherein there are brightness values with consecutive zero outputs found in the grayscales of a dark field in the Gamma 1.8. After the adaptive offset compensation counts the total number of levels with a brightness value equal to 0 in the $1^{st}$~$8^{th}$ grayscale layers, reads the minimum brightness value in the $1^{st}$~$8^{th}$ grayscale layers, and lists the missing decimal integers and the quantity of missing decimal integers within a non-consecutive numbers range of the $1^{st}$~$8^{th}$ grayscale layers, the minimum brightness value is filled into the first grayscale layer, and then the decimal-integers are used sequentially to linearly adjust the brightness value of at least some of the 0~$8^{th}$ grayscale layers. In other words, after the layering control processor 12 performs the adaptive offset compensation on the grayscale brightness values in the Gamma 1.8 Curve and counts the total number of levels with a brightness value equal to 0 in $1^{st}$~$8^{th}$ grayscale layers, including 1 (the minimum brightness value in the $1^{st}$~$8^{th}$ grayscale layers), and the nine missing decimal integers 3, 5, 7, 8, 10, 11, 13, 14 and 15 in the non-consecutive numbers range in the $1^{st}$~$8^{th}$ grayscale layers, the brightness value 1 is filled into the first grayscale layer, and then the missing decimal integer 3 is used to linearly adjust the brightness values in the 0~$8^{th}$ grayscale layers, so as to improve the detailed brightness distribution of the grayscale layers in the dark field and further improve the image quality.

| Gray Level | Gamma 1.0 | Gamma 1.6 | Gamma 1.8 | Adaptive offset compensation | Gamma 2.0 | Adaptive offset compensation | Gamma 2.2 | Adaptive adjustment | Gamma 2.4 | Adaptive adjustment |
|---|---|---|---|---|---|---|---|---|---|---|
| 0 | 0 | 0 | 0 | 0 | 0 | 0 | 0 | 0 | 0 | 0 |
| 1 | 32 | 1 | 0 | 1 | 0 | 1 | 0 | 0 | 0 | 0 |
| 2 | 64 | 3 | 1 | 2 | 0 | 2 | 0 | 1 | 0 | 0 |
| 3 | 96 | 6 | 2 | 3 | 1 | 3 | 0 | 1 | 0 | 1 |
| 4 | 128 | 10 | 4 | 4 | 2 | 4 | 0 | 1 | 0 | 1 |
| 5 | 160 | 15 | 6 | 6 | 3 | 5 | 1 | 2 | 0 | 1 |
| 6 | 192 | 20 | 9 | 9 | 4 | 6 | 2 | 2 | 1 | 1 |
| 7 | 224 | 26 | 12 | 12 | 6 | 7 | 3 | 3 | 1 | 2 |
| 8 | 256 | 32 | 16 | 16 | 8 | 8 | 4 | 4 | 2 | 2 |
| 9 | 289 | 38 | 19 | 19 | 10 | 10 | 5 | 5 | 2 | 2 |
| 10 | 321 | 46 | 24 | 24 | 12 | 12 | 6 | 6 | 3 | 3 |
| 11 | 323 | 53 | 28 | 28 | 15 | 15 | 8 | 8 | 4 | 4 |
| 12 | 385 | 61 | 33 | 33 | 18 | 18 | 9 | 9 | 5 | 5 |
| 13 | 417 | 70 | 38 | 38 | 21 | 21 | 11 | 11 | 6 | 6 |
| 14 | 449 | 78 | 44 | 44 | 24 | 24 | 13 | 13 | 7 | 7 |
| 15 | 481 | 88 | 49 | 49 | 28 | 28 | 16 | 16 | 9 | 9 |

Wherein, the components of the present disclosure are realized through hardware, or software supplemented by hardware, for example, the definitions of the signal receiving processor 10, the situation capture processor 11 and the layering control processor 12 essentially refer to the integration of various hardware devices such as CPU, microprocessor, memory or signal transmitter, etc., and are implemented with software programs. Of course, the present disclosure can be provided with a GUI interface for the viewers to adjust the gamma value or brightness, or switch to the black screen mode for sleep, etc., and the memory storage unit 121 can be integrated into a FPGA circuit board, so that the second YUV signals 1200 and the maximum brightness current value 1220 outputted through the FPGA circuit integration can be exported to the driver IC of the display screen 20 by the system of the present disclosure.

What is claimed is:

1. An automatic gamma adjustment system with environmental adaptability, installed in a display device, and provided for automatically correcting a gamma value at any time according to surrounding situation to adjust grayscale layering presented to people, characterized in that:

the automatic gamma adjustment system with environmental adaptability comprises a signal receiving processor, a situation capture processor and a layering control processor, wherein the signal receiving processor selects an image signal source and receives and converts an image signal into a plurality of first YUV signals; the situation capture processor detects the surrounding situation, captures at least one environmental data, calculates the environmental data to obtain a gamma control parameter of a display screen of the display device, and the layering control processor calculates the environmental data to obtain a maximum brightness current value, while using the gamma control parameter to calculate and convert the first YUV signals into a plurality of second YUV signals, and transmitting the maximum brightness current value and the second YUV signals to the display device for the display screen to display an image according to the maximum brightness current value and the second YUV signals;

wherein, the environmental data comprises at least one of air quality, weather condition, and ambient brightness; the display screen is composed of a plurality of display panels, and the display device makes one of the display panels as a commander and rest of the display panels as followers, and after the display panel acting as the commander receives the second YUV signals and the maximum brightness current value transmitted by the layering control processor, the display panel acting as the commander drives the display panels acting as the followers to use the second YUV signals and the maximum brightness current value to display the image, such that the image displayed by the display screen shows a unified grayscale layering.

2. The automatic gamma adjustment system with environmental adaptability according to claim 1, wherein the layering control processor comprises a memory storage unit provided for the layering control processor to use the gamma control parameter to calculate and obtain the second YUV signals and buffer the second YUV signals into the memory storage unit, or to use the gamma control parameter to look up in a table to obtain the second YUV signals stored in the memory storage unit; wherein, memory of the memory storage unit and memory of the display device have a first gamma parameter conversion table and a second gamma parameter conversion table respectively, provided for the layering control processor to look up the second YUV signals from the first gamma parameter conversion table and the second gamma parameter conversion table, such that the memory storage unit still provides multi-selective gamma groups when situated in low memory storage capacity; the layering control processor comprises a temperature protection unit and a maximum brightness conversion unit, the temperature protection unit is electrically coupled to the display screen for receiving a current working temperature fed back by the display screen, and driving the maximum brightness conversion unit to adjust the maximum brightness current value if the current working temperature obtained is determined to be not falling within a safe interval value; and the layering control processor further converts the second YUV signals into a plurality of RGB signals.

3. The automatic gamma adjustment system with environmental adaptability according to claim 2, wherein the display device uses an 8-bit, 13-bit, 16-bit or 24-bit grayscale image to display the image, and when grayscale levels are greater than 256 levels, the layering control processor uses the gamma control parameter to calculate and obtain the second YUV signals by an adaptive offset compensation to adjust and correct brightness value of 0~$8^{th}$ grayscale layers, such that the brightness values of 0~$8^{th}$ of the grayscale layers have no consecutive zero outputs; wherein, after the adaptive offset compensation counts total number of levels with the brightness value equal to 0 in $1^{st}$~$8^{th}$ of the grayscale layers, reads minimum brightness value in $1^{st}$~$8^{th}$ of the grayscale layers, and lists missing decimal integers and quantity of the missing decimal integers within a non-consecutive numbers range of $1^{st}$~$8^{th}$ of the grayscale layers, the minimum brightness value is filled in first grayscale layer, and then decimal-integers are used sequentially to linearly adjust the brightness value of at least some of 0~$8^{th}$ of the grayscale layers.

4. The automatic gamma adjustment system with environmental adaptability according to claim 2, wherein the display device uses an 8-bit, 13-bit, 16-bit or 24-bit grayscale image to display the image, and when grayscale levels are greater than 256 levels, and the layering control processor calculates and obtains the second YUV signals by the gamma control parameter, an adaptive adjustment is used to adjust brightness values of 0~$8^{th}$ of the grayscale layers, such that the brightness values of 0~$8^{th}$ of the grayscale layers do not have four or more consecutive zero outputs of the brightness values.

5. An automatic gamma adjustment system with environmental adaptability, installed in a display device, and provided for automatically correcting a gamma value at any time according to surrounding situation to adjust grayscale layering presented to people, characterized in that:

the automatic gamma adjustment system with environmental adaptability comprises a signal receiving processor, a situation capture processor and a layering control processor, the signal receiving processor selects an image signal source and receives and converts an image signal into a plurality of first YUV signals;

the situation capture processor detects the surrounding situation and captures and obtains at least one environmental data to obtain a gamma control parameter of a display screen of the display device according to calculation of the environmental data;

the layering control processor calculates the environmental data to obtain a maximum brightness current value, while using the gamma control parameter to calculate and convert the first YUV signals into a plurality of second YUV signals, sending the maximum brightness current value and the second YUV signals to the display device for the display screen to display the image according to the maximum brightness current value and the second YUV signals;

the environmental data include at least one of air quality, weather condition and ambient brightness; after the signal receiving processor analyses the image signal to obtain a corresponding image grayscale distribution data, and the layering control processor analyses the image grayscale distribution to highlight a range with concentrated image grayscale distribution, the image signal in the range is used to calculate the gamma control parameter to obtain the second YUV signals corresponding to a full grayscale level, so as to improve fineness of grayscale presented in the range, so that overall too-dark or too-bright image is presented with rich detailed image to satisfy visual experience of human eyes.

6. The automatic gamma adjustment system with environmental adaptability according to claim 5, wherein the layering control processor comprises a memory storage unit provided for the layering control processor to use the gamma control parameter to calculate and obtain corresponding second YUV signals which are buffered to the memory storage unit, or use the gamma control parameter to look up in a table to obtain the second YUV signals which are stored into the memory storage unit; memory of the memory storage unit and memory of the display device comprise a first gamma parameter conversion table and a second gamma parameter conversion table respectively, which are provided for the layering control processor to look up the second YUV signals from the first gamma parameter conversion table and the second gamma parameter conversion table, such that when the memory storage unit is situated in a low memory storage capacity status, the memory storage unit still provides multi-selective gamma groups; the layering control processor comprises a temperature protection unit and a maximum brightness conversion unit, the temperature protection unit is electrically coupled to the display screen to receive a current working temperature fed back by the display screen, and drives the maximum brightness conversion unit to adjust the maximum brightness current value when determining and obtaining the current working temperature which does not fall within a safe interval value; and the layering control processor converts the second YUV signals into a plurality of RGB signals.

7. The automatic gamma adjustment system with environmental adaptability according to claim 6, wherein the display device uses an 8-bit, 13-bit, 16-bit or 24-bit grayscale image to display the image, and when grayscale levels are greater than 256 levels, and the layering control processor uses the gamma control parameter to calculate and obtain the second YUV signals, an adaptive offset compensation is used to adjust brightness value of 0~$8^{th}$ of the grayscale layers, such that the brightness values of 0~$8^{th}$ of the grayscale layers do not have consecutive zero outputs; the adaptive offset compensation counts total number of levels with the brightness value equal to 0 in $1^{st}$~$8^{th}$ of the grayscale layers, reads minimum brightness value in $1^{st}$~$8^{th}$ of the grayscale layers, and lists missing decimal integers and quantity of the missing decimal integers within a non-consecutive numbers range of $1^{st}$~$8^{th}$ of the grayscale layers, and the minimum brightness value is filled in first grayscale layer, and then decimal-integers are used sequentially to linearly adjust the brightness value of at least some of 0~$8^{th}$ of the grayscale layers.

8. The automatic gamma adjustment system with environmental adaptability according to claim 6, wherein the display device uses an 8-bit, 13-bit, 16-bit or 24-bit grayscale image to display the image, and when grayscale levels are greater than 256 levels, and the layering control processor uses the gamma control parameter to calculate and obtain the second YUV signals, an adaptive adjustment is used to adjust the brightness values of 0~$8^{th}$ of the grayscale layers, such that the brightness values of 0~$8^{th}$ of the grayscale layers do not have four or more consecutive zero outputs of the brightness values.

* * * * *